United States Patent

[11] 3,599,762

[72] Inventors Frank T. Cox, Jr.;
Robert R. Svenson, both of Rochester, N.Y.
[21] Appl. No. 3,420
[22] Filed Jan. 16, 1970
[45] Patented Aug. 17, 1971
[73] Assignee North American Rockwell Corporation
Pittsburgh, Pa.
Continuation-in-part of application Ser. No. 723,815, Apr. 24, 1968, now abandoned.

[54] WEDGE-ACTUATED THREE-SHOE BRAKE
6 Claims, 3 Drawing Figs.
[52] U.S. Cl. .................................................. 188/323, 188/343, 188/368
[51] Int. Cl. ................................................... F16d 51/32
[50] Field of Search ....................................... 188/323, 324, 343, 368, 326; 192/75, 76

[56] References Cited
UNITED STATES PATENTS
| | | | |
|---|---|---|---|
| 2,365,715 | 12/1944 | Mattersdorf.................. | 188/323 |
| 2,475,492 | 7/1949 | Goepfrich et al. ........... | 188/326 |
| 2,828,835 | 4/1958 | Brisson........................ | 188/323 |

Primary Examiner—Duane A. Reger
Attorneys—John R. Bronaugh, George R. Powers and Floyd S. Levison ABSTRACT: A low radial profile drum brake mechanism including at least three brakeshoe assemblies and actuators positioned within a narrow annular space formed between the brakedrum and the drive mechanism of a heavy-duty vehicle. The actuators include wedges for forcing the adjacent brakeshoe assemblies apart and into engagement with the drum, the force input to the wedges being provided from a point outside of the narrow annular space.

WEDGE-ACTUATED THREE-SHOE BRAKE

This application is a continuation-in-part of application Ser. No. 723,815 for "Brake," filed on Apr. 24, 1968, now abandoned, in the names of Frank T. Cox, Jr., and Robert R. Svenson and assigned to the assignee of this invention.

This invention relates to a drum brake mechanism having multiple brakeshoes and actuators and, more particularly, to a brake mechanism having an extremely low radial profile. The brake mechanism of this invention is particularly adapted for use in heavy-duty automotive vehicles such as large earthmoving vehicles and the like since it permits the use of a relatively small brakedrum in combination with a large diameter drive mechanism.

In large earthmoving vehicles and the like, the center opening of the brake mechanism must often be of large diameter in order to accommodate the necessarily large diameter drive mechanism required to bear high loads and operating torque. Frequently, it is necessary to accommodate within the center opening a relatively bulky planetary outer end drive axle or a large electric drive motor and associated drive apparatus. This means that the annular space surrounding the center opening for receiving the brakeshoes and actuators necessarily has a relatively large inner diameter. The outer diameter of this annular space is defined by the brakedrum, which is normally positioned within the tire. For satisfactory operation, prior art brake arrangements have dictated that the brakedrum be substantially larger than the center opening in order to provide the annular space with substantial radial height. This approach, however, fails to take full advantage of recent improvements in tire construction which have reduced significantly the tire size required to support a given load. More particularly, this approach results in the use of oversize tires selected not on the basis of load capacity but on the basis of having an inner diameter sufficient to receive a brakedrum large enough to contain the brake mechanism. Tire costs could be reduced substantially if the drum size could be reduced so as to permit the use of tires of smaller, but adequate, size. However, such reduction of the brakedrum size has not been possible heretofore in view of the requirement of conventional brake arrangements for substantial radial height within the annular space. It has been found that proportional enlargement of components suitable for use in smaller brakes is not a suitable solution to this problem since this approach results in a disproportionate increase in the overall weight of the brake system and physical interference between the parts during brake operation. In addition, the heavy duty braking service of such brakes requires the production of very high brake loading forces and results in the generation of large quantities of heat during braking. The actuators of many conventional brake arrangements have been found to be either incapable of producing sufficient loading forces when small enough to fit within the limited radial height of the annular space or adversely affected by the heat generated during braking.

It is therefore a primary object of this invention to provide an improved drum brake mechanism suitable for use in heavy-duty automotive vehicles having large axles or other driving apparatus.

Another object is to provide a drum brake mechanism having an extremely low radial profile suitable for use in combination with a relative small brakedrum and a large diameter drive mechanism.

Still another object of the invention is to provide in heavy-duty automotive vehicles drum brake apparatus for permitting the use of tires of minimum size consistent with load requirements.

A further object of the invention is to provide for heavy-duty automotive vehicles an improved brake mechanism of relatively low weight.

A still further object is to provide a relatively low radial profile brake mechanism for heavy-duty automotive vehicles in which the brake actuators are capable of producing high loading forces.

Yet another object of the present invention is to provide for heavy-duty vehicles having limited space for brake components a drum brake mechanism having actuators substantially unaffected by heat generated during braking.

Briefly stated, in accordance with a preferred embodiment of the invention, a low profile brake mechanism for heavy-duty vehicles includes a rigid brake support member having a large center opening for accommodating drive mechanism of corresponding size and a cylindrical drum surrounding the support member, the drum being of a size such that the annular space formed between the drive mechanism and the drum is of relatively small radial height. At least three brakeshoe assemblies and an equal number of actuators are peripherally spaced apart within the annular space, an actuator being positioned between each pair of adjacent ends of the brakeshoe assemblies to selectively force the adjacent brakeshoe assemblies apart and radially outwardly into frictional engagement with the drum. Each actuator includes a housing fixed to the support member within the annular space and opposed plungers extending from the housing to engage the brakeshoe assemblies. The plungers are forced apart by a wedge actuated from a point outside of the annular space. In accordance with a further aspect of the invention, the force exerted on the wedge to force the plungers apart is provided by a hydraulic cylinder and piston assembly axially spaced from the annular space. By a still further aspect of the invention, the diameter of the center opening is more than half of the diameter of the brakedrum.

Further objects and advantages of the invention will become apparent from the appended claims and the following detailed description of the preferred embodiment with reference to the illustrated drawings.

Figure 1:
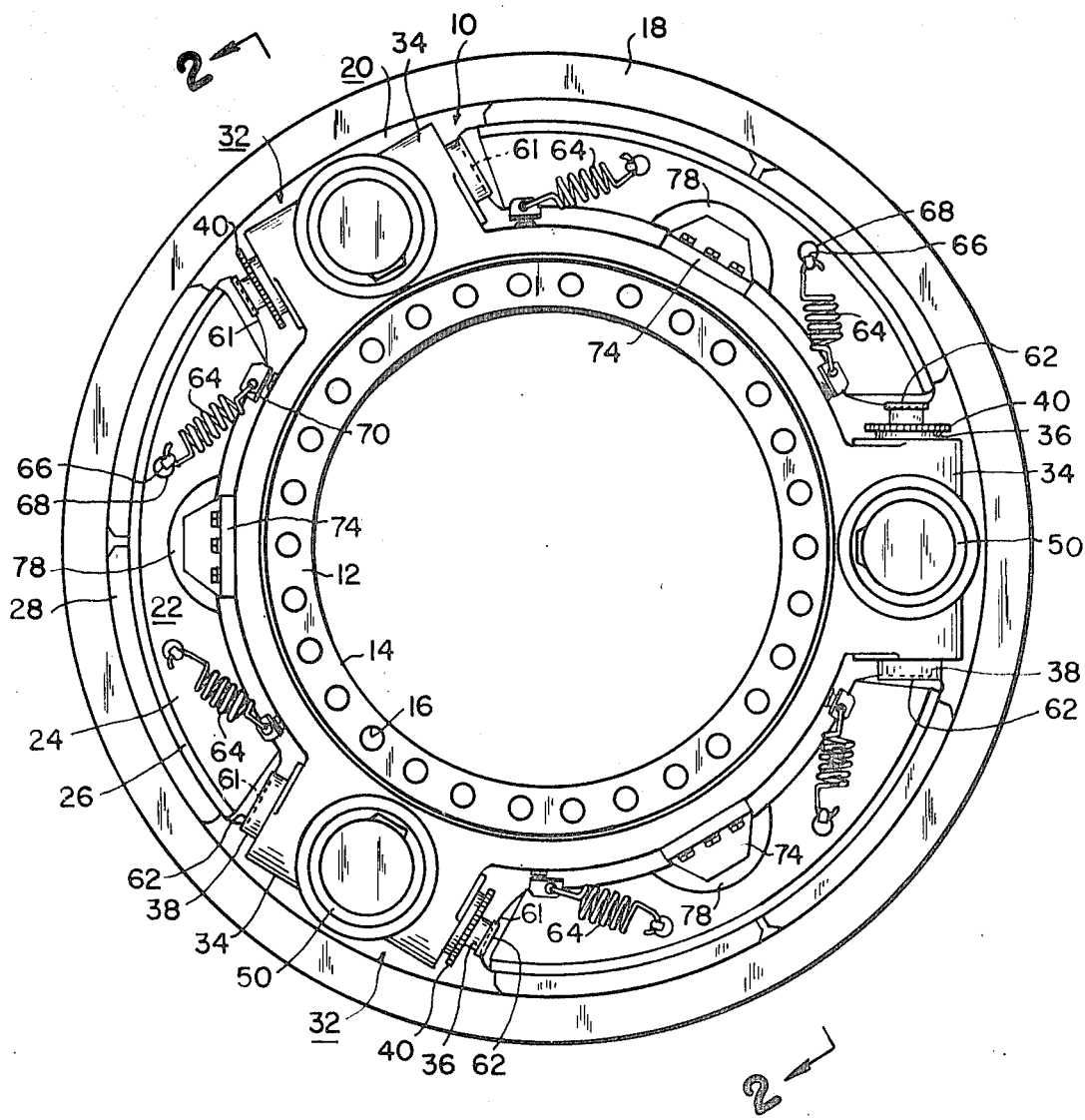
FIG. 1 is an end view of a drum brake assembly embodying the present invention, the assembly including three floating brakeshoes and three actuators.

With reference to FIG. 1, a brake assembly 10 incorporating the present invention is illustrated, the brake assembly 10 including a central support member or spider 12 having a central opening 14 therein adapted to fit over a drive mechanism or axle assembly (not shown) and a peripheral series of holes 16 for receiving bolts for attaching the spider 12 to the drive mechanism. In large heavy-duty vehicles, the central opening 14 is necessarily quite large in order to accommodate the heavy-duty drive mechanism. The spider 12 is peripherally surrounded by a brakedrum 18 such that an annular space 20 is formed therebetween, the space 20 being of relatively small radial height since, as illustrated, the central opening 14 has a diameter of about half that of the brakedrum 18. In a typical embodiment of the present invention, the inner diameter of the drum 18 is approximately 42 inches while the bolt holes 16 are positioned in a circle having a diameter of approximately 25 inches.

Figure 2:
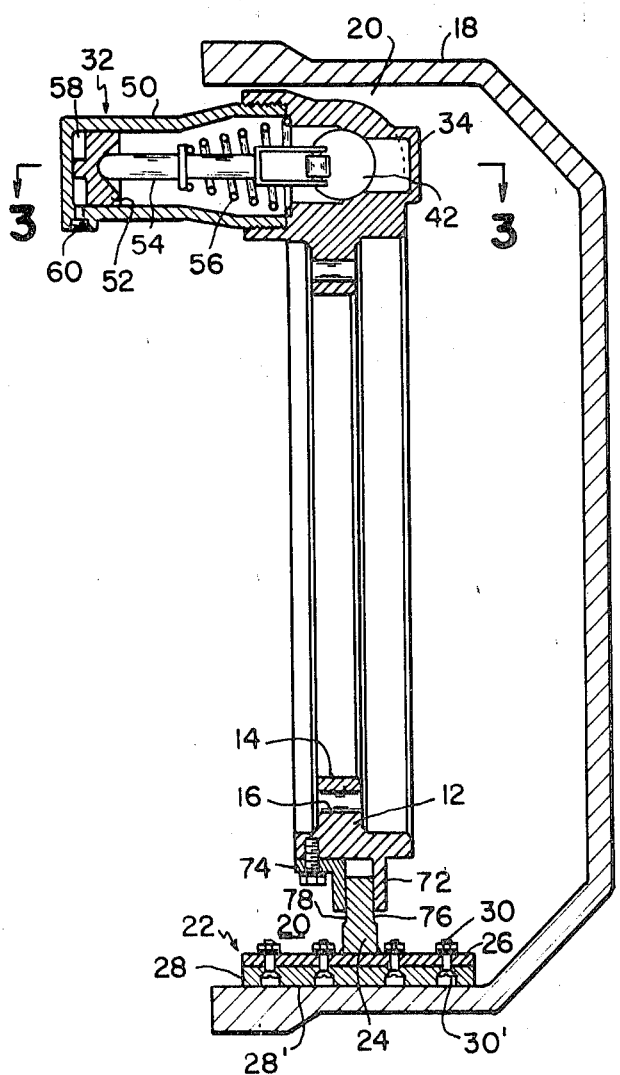
FIG. 2 is a section taken along line 2–2 of FIG. 1 with parts behind the section line omitted for clarity.

Three peripherally equally spaced-apart brakeshoe assemblies 22 are disposed within the radial space 20. The brakeshoe assemblies 22 are of the full floating type, each assembly 22 including an arcuate radially disposed web 24, an arcuate brakeshoe 26, and linings 28 secured to the brakeshoe 26 by bolts 30. As shown by FIG. 2, the heads 30' of the bolts 30 are countersunk below the outer surfaces 28' of the linings 28 to permit substantial wear of the linings 28 before the heads 30' approach the brakedrum 18 and thereby require replacement of the linings. Alternatively, the linings can be bonded to the brakeshoes; in such a case, the linings can be substantially completely worn away before replacement becomes necessary.

Figure 3:
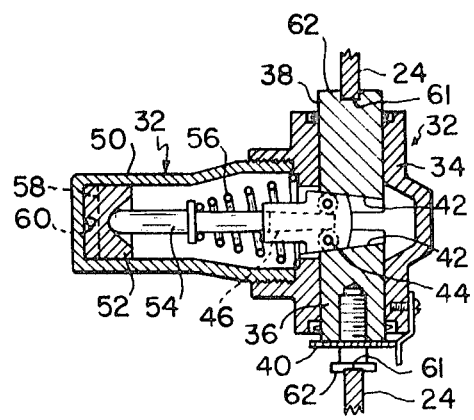
FIG. 3 is a section taken along line 3–3 of FIG. 2 showing the actuating mechanism.

Referring to FIGS. 1 and 2, three peripherally equally spaced-apart brake actuators 32 are also disposed within the radial space 20, each actuator 32 being positioned between the ends of an adjacent pair of brakeshoe assemblies 22. Each actuator 32 includes a housing 34 fixedly secured to the spider 12. As illustrated by FIGS. 1 and 2, the housings 34 are integrally cast with the spider 12, but it will be obvious to those skilled in the art that the housings 34 could be bolted or otherwise secured to the spider 12. As best shown by FIG. 3, each actuator 32 also includes a pair of tangentially or circumferentially oppositely directed plungers 36 and 38 extending therefrom and movable in unison out of or into the housing 34. The plunger 36 is adjustable by means of a star wheel 40. The actuators 32 and their respective housings 34 and plungers 36 and 38 are preferably of the type described in U.S. Pat. No. 3,037,584 to which attention is directed if any additional information is desired with respect to the construction and operation of the actuators.

Referring now to FIGS. 2 and 3, the inner ends 42 of the plungers 36 and 38 are inclined, and rollers 44 are positioned between and in rolling engagement with the inclined surfaces 42 and inclined surfaces on a reciprocable wedge 46. Movement of the wedge 46 to the right as viewed in FIG. 3 forces the plungers 36 and 38 apart and thus out of the housing 34, and movement of the wedge 46 to the left permits the plungers 36 and 38 to move toward each other or into the housing.

The wedge 46 of each actuator 32 is operated by a force producing mechanism comprising a hydraulic cylinder 50 and piston 52 assembly axially spaced from the annular space 20 between the support 12 and the drum 18. The piston 52 abuts a push rod 54 formed integrally with the wedge 46 and biased against the piston 52 by a compression spring 56. The opposite side of the piston 52 is exposed to a closed chamber 58 to which hydraulic fluid is selectively admitted and discharged through a port 60. When hydraulic fluid is admitted to the chamber 58, the piston 52, the pushrod 54, and the wedge 46 are forced to the right as viewed in FIG. 3 to force the plungers 36 and 38 apart and, as will become apparent as this description proceeds, thereby force the brake linings 28 into contact with the brakedrum 18. When hydraulic fluid is discharged from the chamber 58, the piston 52, the pushrod 54, and the wedge 46 are forced to the left as viewed in FIG. 3 by the compression spring 56, thereby permitting movement of the plungers 36 and 38 into the housing 34.

As illustrated by FIG. 1, the outer ends 62 of the plungers 36 and 38 contact inclined end surfaces 61 of the webs 24 of the adjacent brakeshoe assemblies 22 at all times, the ends 61 of the webs 24 being held against the ends 62 of the plungers by return springs 64 located on opposite sides and opposite ends of the webs. Each spring 64 is attached at one of its ends to a pin 66 passing through an aperture 68 in the web 24 and at the other of its ends to a pintle hook 70 radially screwed into the outer circumferential surface of the spider 12. Simultaneous pressurization of the three chambers 58 results in simultaneous movement of all of the plungers 36 and 38 out of the housings 34 and corresponding radially outward displacement of the brakeshoe assemblies 22 due to the force exerted on the ends 61 by the plungers 36 and 38, and simultaneous depressurization of the three chambers 58 results in simultaneous movement of all of the plungers 36 and 38 into the housings due to radially inward displacement of the brakeshoe assemblies 22 under the influence of the springs 64 (this movement being permitted by movement of the wedge 46 to the left as viewed in FIG. 3 under the influence of the spring 56). Through suitable adjustment of the star wheels 40 of the plungers 36, the linings 28 may be made to engage the brakedrum 18 when the chambers 58 are pressurized and there is a slight clearance between the linings 28 and the drum 18 when the chambers 58 are depressurized. This normal clearance is too small to appear in FIGS. 1 and 2.

The return spring arrangement described above with the springs 64 applying a uniform load on each side and each end of the shoe web 24 ensures return movement of the brakeshoe assemblies 22 along a radial path, reduces any tendency of the shoe to be twisted or distorted as it is returned, and enables smaller springs to be used.

The foregoing return spring arrangement is disclosed and claimed in a copending application Ser. No. 723,812, filed on Apr. 24, 1968, in the name of Richard L. Powers.

As shown by FIG. 1, each of the brakeshoe assemblies 22 is centered and held in alignment with respect to the brakedrum 18 by a guide 72 integral with spider 12 and a cooperating guide 74 bolted to the spider, the guides slidably engaging the web 24 in web recesses 76 and 78, respectively. The removable guide 74 faces the open end of the drum. Since the return springs are also accessible from the open end of the drum, the brakeshoe assemblies 22 may be removed and replaced without removing the wheel or drum 18.

As discussed above, in very large diameter brake systems, particularly those of 42 inches in diameter and above, it is desirable that the radial width of the annular space 20 between the drive mechanism and the spider 12 and the brakedrum 18 be quite small so that a relatively small tire can be used in combination with a large heavy-duty drive mechanism. To permit this, the size of the actuators 32, the brakeshoe assemblies 22, and return springs 64 must be correspondingly minimized to accommodate these elements within the limited annular space.

If only two brakeshoes and actuators are used in such a large heavy-duty brake system, it would be necessary to use large and heavy brake actuators and shoes to obtain the required high power input for successful brake application. It has been discovered that in such a two-shoe system, interference problems develop between the brakedrum 18 and the star wheel 40 of the adjustable plunger 36 after adjustment to compensate for limited lining wear. Adjustment of the plunger 36 and star wheel 40 outwardly shifts the floating shoe circumferentially relative to the brakedrum 18. A condition is reached, however, in which, upon application of the brake and full extension of the plunger and star wheel, these elements contact the brakedrum and interfere with proper operation of the brake system. This condition has been found to occur in two-shoe arrangements for heavy-duty brakes before the brake linings have been fully worn.

The use of multiple, i.e. at least three, brakeshoes and actuators in accordance with the present invention avoids these problems and provides a low radial profile brake mechanism which is readily accommodated within a radially restricted annular space and which is comprised of standard sized components. The invention thus eliminates the need for specially designed enlarged and heavy elements and the interfering structural problems associated therewith. It has been found that the multiple relatively small and low radial profile brake actuators and brakeshoe assemblies of this invention are capable of producing the required high loading forces. Additionally, the use of multiple shoes has reduced the total amount of circumferential shift of the floating shoes to minimize the interference problem further.

The multiple shoe system is also advantageous in that it limits drum distortion and provides an improved force distribution between the shoes and brakedrum. In a floating shoe brake system, the braking force is initially maximized at the end portions of the brake lining. When using only two shoes in a large brake system, there is a tendency to distort the circular brakedrum into a generally rectangular configuration with rounded ends, since there are only four force-maximized contact areas between the ends of the linings and the drum. However, with a three-shoe system for example, this tendency is substantially reduced due to the improved force distribution resulting from the existence of at least six areas of maximized force application which tend to distort the drum into a triangular rather than rectangular configuration and which provide a more stable brake system.

Furthermore, the actuators of the drum brake mechanism of this invention are substantially unaffected by the large amount of heat generated during braking since the cylinders 50 are axially offset from the annular space 20 within which heat is generated through frictional engagement of the linings 28 with the drum 18. Consequently, the hydraulic fluid supplied to the cylinders 50 is isolated from the high temperature existing within the space 20. Furthermore, it has been found that the use of multiple shoes rather than two shoes improves the heat dissipation characteristics of the brakedrum. In operation the drum is cooled as portions of its periphery pass the gaps between the ends of adjacent brakeshoes. In the multiple shoe arrangement, these gaps occur with greater frequency and therefore effect improved cooling resulting in reduced brake force and increased lining life.

From the foregoing, it will be appreciated that the invention provides an improved drum brake mechanism suitable for use in heavy-duty automotive vehicles having large axles or other driving apparatus. The improved brake mechanism has an extremely low radial profile so as to permit the use of tires of minimum size consistent with load requirements. The brake mechanism of this invention includes multiple small and lightweight components capable of producing high loading forces without being adversely affected by heat generated during braking.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim as new and desire to be secured by Letters Patent is:

1. For use in a heavy-duty vehicle having a large diameter wheel drive mechanism such as a drive axle or the like and a relatively small cylindrical brakedrum coaxially surrounding the drive mechanism, the brakedrum defining the outer periphery of a narrow annular space outwardly of the drive mechanism, a low profile brake mechanism comprising:
   a rigid support member having a large center opening adapted to fit over said drive mechanism, means for nonrotatably securing said support member to said drive mechanism,
   at least three brakeshoe assemblies peripherally equally spaced apart within said annular space, means interconnecting said support member and said brakeshoe assemblies to support and guide said brakeshoe assemblies between positions in which said brakeshoe assemblies are spaced radially inwardly of said brakedrum and in which said brakeshoe assemblies frictionally engage the brakedrum,
   an equal number of actuators each positioned within a respective one of the peripheral spaces formed between adjacent brakeshoe assemblies and each actuator having a housing secured to said support member in a fixed position relative thereto,
   a pair of plungers extending in opposite peripheral directions from each housing into engagement with the adjacent brakeshoe assemblies,
   and a wedge within each housing to force said plungers apart when said wedge is moved in one direction and to permit said plungers to move toward each other when said wedge is moved in the opposite direction,
   the engagement between said plungers and said brakeshoe assemblies being such that said brakeshoe assemblies are forced into frictional engagement with the brakedrum when said plungers are forced apart by said wedge.

2. A low profile brake mechanism as defined by claim 1 further comprising a plurality of force-producing means each associated with a respective one of said actuators and means mechanically interconnecting each of said force-producing means and the respective wedge for transmitting force therebetween, said force-producing means being located outside of said annular space.

3. A low profile brake mechanism as defined by claim 2 in which each force-producing means comprises a hydraulic cylinder and piston assembly, said hydraulic cylinder and piston assembly being axially spaced from said annular space such that hydraulic fluid therein is substantially unaffected by heat generated during braking.

4. A low profile brake mechanism as defined by claim 1 further comprising first return spring means interconnecting each of said brakeshoe assemblies and said support member to bias said brakeshoe assemblies to their disengaged positions radially inward of the brakedrum and second return spring means connected to each wedge to bias said wedge in the direction permitting said plungers to move toward each other, whereby said first return spring means move said brakeshoe assemblies to their disengaged positions and said plungers toward each other in response to movement of said wedge in response to said second return spring means.

5. A low profile brake mechanism as defined by claim 4 further comprising a plurality of hydraulic cylinder and piston assemblies each associated with a respective one of said actuators and means mechanically interconnecting each of said force producing means and the respective wedge for transmitting force thereto to overcome said second return spring means and move said wedge in the direction to force said plungers apart when said hydraulic cylinder and piston assemblies are pressurized.

6. A low profile brake mechanism as defined by claim 5 in which said hydraulic cylinder and piston assemblies are axially spaced from said annular space such that hydraulic fluid therein is substantially unaffected by heat generated during braking.